Dec. 30, 1958     J. L. STRATTON     2,866,953
MECHANICAL-ELECTRICAL TRANSDUCERS
Filed June 29, 1956

Inventor
Jerry L. Stratton
by Merton D. Moore
His Attorney

United States Patent Office 2,866,953
Patented Dec. 30, 1958

2,866,953

MECHANICAL-ELECTRICAL TRANSDUCERS

Jerry L. Stratton, Schenectady, N. Y., assignor to General Electric Company, a corporation of New York Application June 29, 1956, Serial No. 594,844

12 Claims. (Cl. 336—110)

This invention relates to mechanical-electrical transducers and particularly to such transducers which employ saturable magnet core members and which may be used in electro-mechanical servo systems.

Mechanical-electrical transducers which employ saturable core members commonly utilize the devices known as saturable reactors and magnetic amplifiers. A major disadvantage of such devices, when used as mechanical-electrical transducers in servo systems, is that their accuracy is not all that could be desired. This is chiefly due to the fact that the characteristics of the reactor varies in an analogue manner in relation to the physical position of an associated mechanical position sensing element. This is so whether the reactor is acted upon by the mechanical element or whether the electrical output of the reactor is used to position the mechanical element. The accuracy of such systems could be greatly increased if the characteristics of the reactor could be made to bear a digital or "on-off" relationship to the physical position of the associated mechanical position-sensing element.

Accordingly, it is an object of this invention to provide a mechanical-electrical transducer of the saturable core reactance type, wherein the characteristics of the reactor vary largely in a digital manner with respect to its associated mechanical position sensing element.

It is to be particularly understood that when the term "mechanical-electrical transducer" is used in the specification and claims, it is intended to refer both to a transducer which converts a mechanical motion or position to a corresponding electrical voltage or current, or such a transducer which converts an electrical control voltage or current to a corresponding mechanical motion or position.

Briefly stated, in accordance with this invention, a mechanical-electrical transducer is provided which utilizes a saturable reactor. The reactor characteristics are made to vary largely in a digital manner with repect to the physical position of an associated mechanical position-sensing element by positioning the reactor winding in flux exchange relationshisp with a laminated saturable core member and providing a magnet which is arranged to be moved in a direction perpendicular to one edge of the core laminations by the mechanical position sensing means. The magnet is either placed in contact with the core laminations or in extremely close proximity thereto whereby the number of laminations contacted or affected by the magnet is dependent upon the position of the transducer position-sensing element and essentially only those laminations contacted by, or in close proximity to the magnet, is saturated by its field.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

Figure 1:
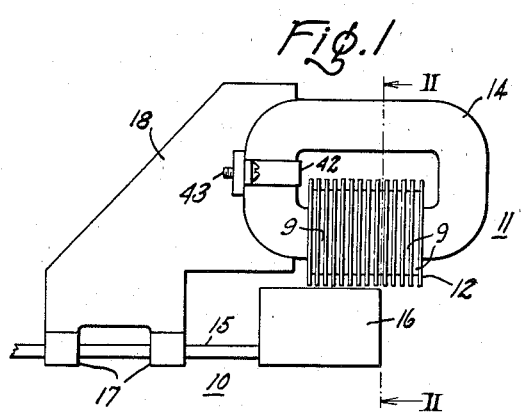
Figure 1 is a plan view of one embodiment of a mechanical-electrical transducer employing the present invention.
Figure 2:
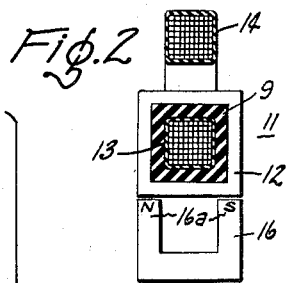
Figure 2 is a sectional view of the transducer of Figure 1, taken along section lines II—II.

Referring specifically to Figures 1 and 2 of the drawing, a mechanical-electrical transducer, in accordance with the invention, is shown as consisting broadly of a mechanical movement sensing element 10 and a saturable core impedance device 11. The saturable core impedance device 11 is illustrated as comprising a saturable magnetic core 12 which consists of a stack of substantially planar laminations having an aperture or opening 13 therethrough, as shown in Figure 2, and a current conducting winding 14 passing through the opening in the stack of laminations. In order to insulate the individual laminations of the core member 12 from each other somewhat and still have them a part of a magnetic circuit, they are preferably spaced slightly (a few thousandths of an inch) by an electrical insulating material 9.

The mechanical position or movement sensing element 10 is illustrated as consisting of a rod or bar 15 and a permanent magnet 16, which is preferably movably mounted in bearings 17 so that its upper surface is in contact with the edges of the laminations in the core member 12 and movable linearly along the edges of the laminations perpendicular to the planes of the laminations in the stack. In this way the permanent magnet can be moved past one lamination at a time. As may be seen from Figure 2, the cross section of magnet 16 is made U-shaped with the upright legs 16a in contact with the core member 12. It has been found that this arrangement provides a high flux concentration in the area of each contacted lamination and reduces fringing effects at the ends of the magnet. In order to fix the position of the bearings 17 with respect to the windings 14 and core member 11, they are held in a bracket 18 which may be secured to the winding 14 in any suitable manner such as by clamp 42 and bolt 43. Thus the permanent magnet may be moved longitudinally while its position relative to the core member 12 is fixed in all other respects.

The movement of any device is sensed by means of the mechanical movement sensing rod 15 which is intended to have one end coupled to such device and its other end fixed to the magnet 16. The rod 15 thus determines the physical position of the magnet 16 relative to the core member 12 in accordance with the physical position of the movement sensed and thereby determines the number of laminations in the core member which are in contact with the magnet 12. The laminations of the core member 12 are preferably made from a core material which has a square loop magnetizing characteristic and the permanent magnet 16 is preferably made of sufficient strength to saturate any lamination which it contacts.

Since all of the core laminations that are in contact with the magnet 16 are completely saturated, they do not contribute appreciably to the reactance of the conducting winding 14 and since nearly all of the laminations of the core member 12 which are not in contact with the magnet 16 are unsaturated, they represent the principal factor in determining the energy which must be supplied to the core member 12 before the reactor 11 will fire. Thus, the characteristic of the reactor 11 is made essentially digital or "on-off" with respect to the physical position of permanent magnet 16. A few laminations near the edge of the magnet 16 will necessarily be in an interim magnetized state (somewhere between zero magnetizing force and saturation) due to the presence of fringing flux around the end of the magnet. This means that there is a small portion of the core member 12 which produces an analogue (non "on-off") portion of the reactor characteristic. However, the reactor may be designed in such a manner that this effect is very small. For example, the reactor may be designed in such a manner that the analogue portion of the energy (volt time integral) required to fire the reactor will represent only 10% of the total. This means that the system is at least 10 times more accurate than one in which the reactor characteristic is 100% analogue.

Figure 3:
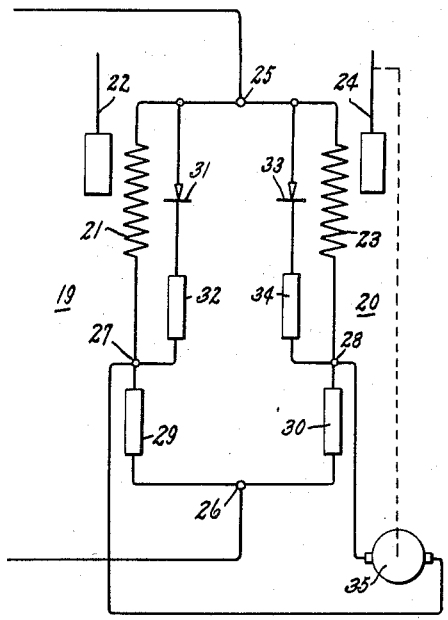
Figure 3 is a circuit diagram of a servo system which employs the electro-mechanical transducer of Figure 1 and illustrates the operation thereof.

Figure 3 illustrates a servo system wherein one mechanical-electrical transducer 19 of the type illustrated in Figures 1 and 2 acts as a mechanical position sensing device and a second such transducer 20 acts as an electrical to mechanical follow-up element. For convenience only the main reactance winding 21 and the input position sensing shaft 22 (including the magnet) of the position sensing transducer 19 are illustrated and in like manner only the main reactance winding 23 and output shaft 24 (including the magnet) of the follow-up transducer 20 is illustrated.

The circuit of the servo system is a simple bridge circuit which has input terminals 25 and 26 which are to be connected across an alternating current voltage source and output terminals 27 and 28 which are provided to supply an error signal. The magnitude and sense of the error signal is determined by the relative positions of the shafts 22 and 24 of the input and output reactors 19 and 20 respectively. The main reactance windings 21 and 23 of the two transducers are connected in the upper adjacent pair of bridge arms and therefore are both connected to the upper bridge terminal 25 and to the diagonally opposite terminals 27 and 28 respectively. The lower pair of adjacent bridge arms contains an impedance connected between the lower input terminal 26 and diagonally opposite output terminals 27 and 28. For example, one lower bridge arm comprises an impedance 29 connected between lower input terminal 26 and the output terminal 27 and the opposite lower bridge arm comprises an impedance 30 connected between the lower input terminal 26 and the diagonally opposite terminal 28. In order to provide bias to prevent the two reactors 19 and 20 from becoming saturated more than once per cycle, two series biasing circuits are connected in parallel with the main reactance windings 21 and 23. The series circuit connected in parallel with the main reactance winding 21 of the input reactor 19 consists of a biasing rectifier 31 and a resistor 32 and the series circuit which is connected in parallel with the main reactance winding 23 of the output transducer 20 consists of a biasing rectifier 33 and a resistor 34. As will be explained more fully later, biasing the reactors in this manner assures that the output error signal produced between the output terminals 27 and 28 is a direct current signal which differentiates between positive and negative position errors.

If we assume that the input position sensing rod 22 and the output positioning shaft 24 are identically positioned with respect to the laminated cores of their respective transducers 19 and 20, that the impedances of the two reactors 19 and 20 are identical, and that the impedances 29 and 30 in the lower ratio arms of the bridge circuit are equal, the bridge circuit will be balanced and there will be no voltage developed between the output terminals 27 and 28, i. e., no error signal. For these conditions the operation of the circuit is as follows: For the half cycle of the supply voltage when the upper bridge input terminal 25 is positive with respect to the lower input terminal 26, equal currents will flow through two parallel current paths. One such path includes biasing rectifier 31, biasing impedance 32 and impedance 29, and the other such current path includes the biasing rectifier 33, biasing impedance 34 and the impedance 30 in the lower right hand bridge leg of the circuit. Since the corresponding impedances in these two current paths are equal, no voltage will be developed between the bridge output terminals 27 and 28.

On the next half cycle of the alternating supply voltage, current will flow in the opposite sense through impedances 29 and 30 and will flow to the upper input terminal 25 of the bridge through the reactance windings 21 and 23 of the transducers 19 and 20 respectively. Current will flow through the reactance windings 21 and 23 on this half cycle due to the fact that the biasing rectifiers 31 and 33 block current flow in the biasing circuits. Since the impedances of the reactance windings 21 and 23 are equal there will be no error voltage developed between the bridge output terminals 27 and 28 and since current flows through the reactance windings 21 and 23 only on one half cycle of a full cycle of supply voltage, the reactors 19 and 20 can only fire on this one half cycle.

Figure 4:
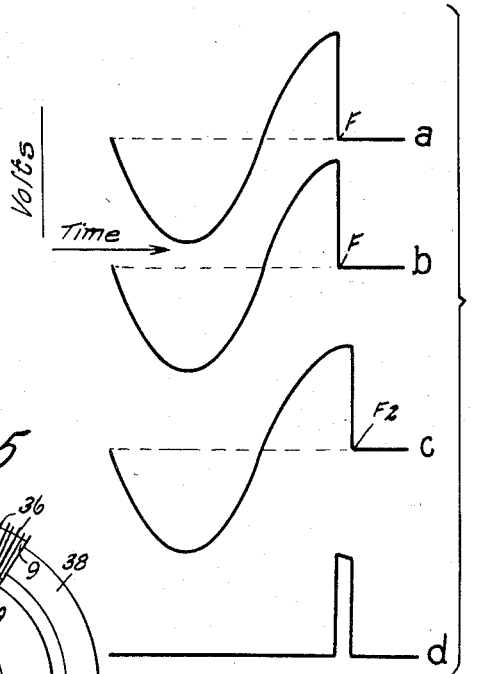
Figure 4 shows various wave shapes utilized in demonstrating and explaining the operation of the transducer of this invention.

The voltage wave of Figure 4a illustrates the voltage measured across the reactance winding 21 of the input transducer and the voltage wave of Figure 4b illustrates the voltage measured across the reactance winding 23. From an inspection of these curves it will be seen that when the reactance of these two transducers is equal they both fire at the same point F in their conducting half cycle.

If the position sensing shaft 22 of the transducer 19 is moved upwardly as indicated by the arrow, fewer of the laminations in the core member for this reactor are contacted by the permanent magnet and therefore fewer of the laminations are saturated. Thus on the conducting half cycle of this reactor more energy must be supplied to the reactor before it will fire and as a consequence the bridge circuit will become unbalanced. Once the bridge circut becomes unbalanced an error voltage will appear between the output terminals 27 and 28. This condition may be seen by reference to Figures 4b, c and d. As was previously pointed out the curve illustrated in Figure 4b represents the voltage as measured across the reactance winding 23 of the output transducer 20 for the initial position of the output shaft 24. Since the output shaft 24 has not been moved this condition still prevails. However, since the position sensing shaft 22 has been moved in a direction that requires more energy to fire the reactor 19, the volt time integral across reactance winding 21 is increased. The voltage measured across the reactance winding 21 is illustrated by the voltage wave of Figure 4c. From this curve it is seen that the reactor 19 now fires at a later point F2 in its conducting half cycle. Thus the voltage drop across the reactance winding 21 of the input reactor 19 is greater than that which occurs across the reactance winding 23 of the output transducer 20 for the period of time which occurs between the firing of the two transducers. This difference in voltage then is developed between the output terminals 27 and 28 of the bridge and the voltage is of such a polarity that the output terminal 27 will be positive with respect to the output terminal 28. Figure 4d illustrates this difference in voltage.

It will be seen that for this condition current will flow through the error circuit from point 27 to point 28. From the above description it should also be apparent that if the position sensing shaft 22 were moved in a direction to cause more of the core laminations of transducer 19 to be saturated, this reactor would fire earlier in its conducting half cycle than would the output transducer 20 and therefore the output terminal 28 would become positive with respect to the output terminal 27 and current would flow in the opposite direction through the error circuit.

In order to utilize the error voltage and provide a closed loop servo system, a reversible motor 35 is connected to receive the voltage developed between the output terminals 27 and 28 of the bridge circuit. This motor is mechanically coupled to the output shaft 24 as indicated by the broken lines in the drawing in order to null the bridge circuit. Thus any error voltage developed across the output terminals of the bridge circuit is applied to the reversible motor to cause it to rotate in the proper direction to change the position of the output shaft 24 until it corresponds to the position of the input shaft 22. For this condition, the bridge is balanced.

The transducer illustrated in Figures 1 and 2 is particularly adapted to sense linear motion due to the fact that its position sensing shaft 15 and magnet 10 are mounted to move longitudinally of the shaft 15. It will be appreciated, however, that the transducer can be utilized to detect movement of any type by providing a mechanical linkage or gearing between the moving element and the position sensing shaft which linkage or gearing mechanism will convert the movement to be sensed into a linear motion.

Figure 5:
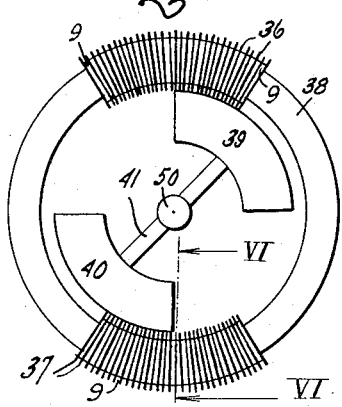
Figure 5 is a plan view of another embodiment of a transducer which employs the present invention.
Figure 6:
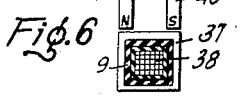
Figure 6 is a sectional view of the apparatus of Figure 5, taken along the lines VI—VI.

Another embodiment of the invention wherein rotary position or motion may be sensed directly as illustrated in Figures 5 and 6. In this embodiment the transducer is provided with a reactor which has two core members 36 and 37, a conducting reactance winding 38 and a position sensing element which consists of a pair of ganged permanent magnets 39 and 40. Each of the core members 36 and 37 are made up of a stack of substantially planar laminations with an opening 44 therethrough. Each stack of laminations is constructed in such a manner that one side of the stack which is made up of edges of the laminations forms a concave arc of a circle and the opposite side of the stack also made up of lamination edges, forms a convex arc of a circle, the planes of the laminations being generally radial. The winding 38 as illustrated is substantially toroidal and passes through the openings in the core members 36 and 37.

As illustrated in Figure 5 the permanent magnets 39 and 40 are connected together by a rod 41 which is connected to a shaft 50 midway between its ends. Each of the magnets has an outer face which defines a convex arc of a circle that matches the concave arc defined by the inter surface of the core members 36 and 37. The rod 41 which gangs the two magnets 39 and 40 is of such a length that the convex face of the magnets engage the concave surfaces of the core members 36 and 37 when the magnets are rotated by the shaft 50. Thus the angular position of the shaft 50 determines the number of laminations in each of the core members 36 and 37 which are contacted by the permanent magnets 39 and 40. As a consequence, the transducer illustrated in Figures 5 and 6 will operate in the same manner as the transducers of Figures 1 and 2 except that it is designed specifically to detect angular position or angular rotation. From Figure 6 which is a cross section view of a portion of the transducer taken along section lines VI—VI it will be seen that the cross section of the magnets 39 and 40 are U-shaped as is the permanent magnet 16 illustrated in Figure 2. The magnets are made in this shape simply to provide a high flux concentration in the area of each contacted lamination. It is obvious that many other shapes could be used and that the magnets may be electromagnets as well as permanent magnets.

It is recognized that the transducers illustrated herein may be used in circuit arrangements other than the one illustrated in Figure 3. The particular circuit of Fig. 3 is only illustrative of one particular arrangement. The transducer is capable of application in any of the known reactor circuits and may be used in such circuits which provide magnetic amplifier gain instead of simple saturable reactor gain as shown.

While particular embodiments of this invention have been shown it will, of course, understood that the invention is not limited thereto since many modifications both in the circuit arrangement and in the instrumentalities employed may be made. It is contemplated that the appended claims will cover any such modifications as fall within the true sprit and scope of this invention.

What I claim as new and desire to secure by Letters Patent of the United States is:

1. A mechanical-electrical transducer comprising a laminated magnetic core member, adjacent laminations of said core member spaced apart with a thin layer of insulating material therebetween, a current conducting winding in flux exchange relationship therewith, and a magnet, said magnet being movably positioned in contact with the core laminations in such a manner that the number of laminations contacted by said magnet is variable and essentially only those laminations contacted by said magnet are saturated by its field.

2. A mechanical-electrical transducer comprising a laminated magnetic core member, adjacent laminations of said core member spaced apart with a thin layer of insulating material therebetween, a current conducting winding in flux exchange relationship therewith, and a magnet, said magnet being movably positioned in close proximity to the core laminations in such a manner that the number of laminations affected by said magnet is variable and essentially all of said laminations so affected are saturated.

3. In a mechanical-electrical transducer, a saturable magnetic core member, consisting of a stack of substantially planar laminations having an opening therethrough, adjacent laminations of said core member spaced apart with a thin layer of insulating material therebetween, a conducting winding passing through the opening in said core member, and a magnet, said magnet being positioned adjacent said core member and linearly movable perpendicular to the plane of said laminations in such a manner that the number of laminations contacted by said magnet is variable and substantially only those laminations contacted by said magnet are affected by its field.

4. In a mechanical-electrical transducer, a saturable magnetic core member consisting of a stack of substantially planar laminations having an opening therethrough, adjacent laminations of said core member spaced apart with a thin layer of insulating material therebetween, a conducting winding in flux exchange relationship with said core member, and a magnet, said magnet being positioned adjacent said core member and linearly movable perpendicular to the plane of said laminations in such a manner that the number of laminations contacted by said magnet is variable and substantially only those laminations contacted by said magnet are affected by its field.

5. A mechanical-electrical transducer comprising a laminated magnetic core member, adjacent laminations of said core member spaced apart with a thin layer of insulating material therebetween, a current conducting winding in flux exchange relationship therewith, and a magnet which is substantially U-shaped in cross-section, said magnet being movably positioned with the top of the upright legs of the U adjacent the core laminations and in contact therewith in such a manner that the number of laminations contacted by said magnet is variable and essentially only those laminations contacted by said magnet are saturated by its field.

6. A mechanical-electrical transducer comprising a laminated magnetic core member, adjacent laminations of said core member spaced apart with a thin layer of insulating material therebetween, a current conducting winding in flux exchange relationship therewith, and a permanent magnet, said magnet being movably positioned adjacent the core laminations and in contact therewith in such a manner that the number of laminations contacted by said magnet is variable and essentially only those laminations contacted by said magnet are saturated by its field.

7. A mechanical-electrical transducer comprising at least one laminated magnetic core member, adjacent laminations of said core member spaced apart with a thin layer of insulating material therebetween, a current conducting winding in flux exchange relationship therewith, and a magnet, said magnet being movably positioned adjacent the core laminations and in contact therewith in such a manner that the number of laminations contacted by said magnet is variable and essentially only those laminations contacted by said magnet are saturated by its field.

8. A mechanical-electrical transducer including at least one laminated core member, said core member having a surface made up of edges of laminations which define an arc, adjacent laminations of said core member spaced apart with a thin layer of insulating material therebetween, a current conducting winding in flux exchange relationship with said core member, and a magnet member having a surface which mates with the arc of said core member, said magnet being positioned adjacent the core laminations in such a manner that the mating surface of said core and magnet are in contact with each other, said core and said magnet being mounted for relative rotation in such a manner that the number of laminations contacted by said magnet is variable.

9. A mechanical-electrical transducer comprising a laminated magnetic core member, adjacent laminations of said core member spaced apart with a thin layer of insulating material therebetween, a current conducting winding in flux exchange relationship therewith, and a magnet, said magnet being positioned adjacent the core laminations and in contact therewith, said core member and said magnet being movable relative to each other in such a manner that the number of laminations contacted by said magnet is variable and essentially only those laminations contacted by said magnet are saturated by its field.

10. A mechanical-electrical transducer having a pair of laminated cores comprised of stacks of substantially planar laminations having an opening therethrough, adjacent laminations of each of said cores spaced apart with a thin layer of insulating material therebetween, each of said core members having a concave surface made up of edges of laminations, said concave surfaces defining an arc, a current conducting winding passing through the openings in each of said core members, and a pair of magnets each having a convex surface defining an arc adapted to mate with the concave surface of one core member, each of said magnets being positioned adjacent one core member in such a manner that the mating surface of said core and said magnets are in contact with each other, said cores and said magnets being mounted for relative rotation whereby the number of laminations contacted by said magnet is variable.

11. A mechanical-electrical transducer including at least one laminated core member, adjacent laminations of said core member spaced apart with a thin layer of insulating material therebetween, said core member having a surface made up of edges of laminations which defines an arc, a current conducting winding in flux exchange relationship with said core member, and a magnet member having a surface which mates with the arc of said core member, said magnet being positioned adjacent the core laminations in such a manner that the mating surface of said core and magnet are in contact with each other, said magnet being mounted for rotation relative to said core member in such a manner that the number of laminations contacted by said magnet is variable.

12. A mechanical-electrical transducer having a pair of laminated cores comprised of stacks of substantially planar laminations having an opening therethrough, adjacent laminations of each of said cores spaced apart with a thin layer of insulating material therebetween, each of said core members having a concave surface made up of edges of laminations, said concave surfaces defining an arc, a current conducting winding passing through the openings in each of said core members, and a pair of magnets each having a convex surface defining an arc adapted to mate with the concave surface of one core member, each of said magnets being positioned adjacent one core member in such a manner that the mating surfaces of said core and said magnets are in contact with each other, said magnets being mounted for rotation relative to said core members in such a manner that the number of laminations contacted by said magnet is variable.

References Cited in the file of this patent

UNITED STATES PATENTS 2,724,075     Van Urk _____ Nov. 15, 1955